(12) United States Patent
Jens et al.

(10) Patent No.: US 6,533,981 B1
(45) Date of Patent: Mar. 18, 2003

(54) MOLDING OF FASTENERS AND OTHER FEATURES

(75) Inventors: Stephen C. Jens, Winchester, MA (US); Andrew C. Harvey, Waltham, MA (US); Richard M. Formato, Grafton, MA (US); Samuel W. Pollard, Durham, NH (US); James Stumpf, Goffstown, NH (US); George A. Provost, Litchfield, NH (US)

(73) Assignee: Velcro Industries B. V., Curacao (AN)

( * ) Notice: Subject to any disclaimer, the term of this patent is extended or adjusted under 35 U.S.C. 154(b) by 0 days.

(21) Appl. No.: 09/341,908

(22) Filed: May 8, 2002

Related U.S. Application Data

(60) Division of application No. 08/926,517, filed on Sep. 10, 1997, now Pat. No. 6,039,556, which is a continuation-in-part of application No. 08/786,226, filed on Jan. 21, 1997, now Pat. No. 5,971,738.

(51) Int. Cl.⁷ ........................... B29C 43/46; B29C 43/52
(52) U.S. Cl. ........................... 264/167; 29/466; 29/467; 29/895.213; 29/895.22; 425/471
(58) Field of Search ............................. 264/167; 29/464, 29/466, 467, 895.2, 895.213, 895.22; 425/194, 363, 471, 814

(56) References Cited

U.S. PATENT DOCUMENTS

| | | | |
|---|---|---|---|
| 973,380 A | * | 10/1910 | Perker .................... 29/895.213 |
| 3,027,595 A | | 4/1962 | Takai et al. |
| 3,031,730 A | | 5/1962 | Morin |
| 3,089,191 A | | 5/1963 | Conrad |
| 3,136,026 A | | 6/1964 | De Mestral |
| 3,261,069 A | | 7/1966 | Mathison |
| 3,312,583 A | | 4/1967 | Rochlis |
| 3,555,601 A | | 1/1971 | Price |
| 3,752,619 A | | 8/1973 | Menzin et al. |
| 3,907,486 A | | 9/1975 | Kennedy et al. |
| 4,573,893 A | | 3/1986 | Waters et al. |
| 4,587,700 A | | 5/1986 | Curbishley et al. |
| 4,725,221 A | | 2/1988 | Blanz |
| 4,775,310 A | | 10/1988 | Fischer |
| 4,794,028 A | | 12/1988 | Fischer |
| 4,872,243 A | | 10/1989 | Fischer |
| 4,894,060 A | | 1/1990 | Nestergard |
| 4,984,339 A | | 1/1991 | Provost et al. |
| 5,038,469 A | * | 8/1991 | Masuda et al. ......... 29/895.213 |
| 5,131,119 A | | 7/1992 | Murasaki et al. |
| 5,174,937 A | | 12/1992 | Tamura et al. |
| 5,326,612 A | | 7/1994 | Goulait |
| 5,339,499 A | | 8/1994 | Kennedy et al. |
| 5,361,462 A | | 11/1994 | Murasaki |
| 5,705,254 A | | 1/1998 | Morinaga et al. |
| 5,971,738 A | * | 10/1999 | Jens et al. .................... 425/363 |
| 6,039,556 A | * | 3/2000 | Jens et al. .................... 425/363 |

FOREIGN PATENT DOCUMENTS

| | | |
|---|---|---|
| WO | WO 94/29070 | 12/1994 |
| WO | WO 95/01863 | 1/1995 |

* cited by examiner

Primary Examiner—James P. Mackey
(74) Attorney, Agent, or Firm—Fish & Richardson P.C.

(57) ABSTRACT

Molding apparatus and method for molding of features integral with a base, such as in the production of fastener elements for hook-and-loop type touch fasteners, e.g. by the Fischer process, employs a mold roll (1) formed of rings (9) that have coolant passages (22) formed within the ring components (9) themselves for substantially direct contact with cooling liquid. Axial tie rods (16) compress the mold rings (9) together, contributing to the sealing of the coolant passages and the stiffness of the mold roll. Mold cavities (2), including cavities (2) used for injection molding, and cooling passages (22) formed in either mold rings (9) or injection mold plates by photo-chemical etching, laser machining and other techniques are disclosed. Various machines and methods taking unique advantage of these features are disclosed, including ring alignment methods for improved base thickness control and for forming products with very thin bases.

27 Claims, 17 Drawing Sheets

MOLDING OF FASTENERS AND OTHER FEATURES

CROSS-REFERENCE TO RELATED APPLICATION

This application is a national stage application filed under 35 U.S.C. §371 from PCT application US98/01053, which is a divisional of U.S. application Ser. No. 08/926,517, filed Sep. 10, 1997, which issued as U.S. Pat. No. 6,039,556 on Mar. 21, 2000, and which is a continuation-in-part of U.S. application Ser. No. 08/786,226, filed Jan. 21, 1997, which issued as U.S. Pat. No. 5,971,738 on Oct. 26, 1999.

BACKGROUND OF THE INVENTION

This invention relates to molding of synthetic resin to produce features that are integral with a base, and has particular application to the production of fastener elements for touch fasteners and the like.

Hook elements for hook-and-loop touch fasteners and other products are effectively produced by the machine and method of Fischer U.S. Pat. No. 4,794,028. In commercial production, a mold roll is formed by a large number of thin, disk-shaped mold rings (sometimes called mold plates) and spacer rings which are stacked concentrically about a central barrel.

Discrete products are also injection molded with fastener elements extending from a base surface by employing, as part of the mold, a series of stacked mold plates defining an array of mold cavities.

At the periphery of the mold rings or mold plates are cavities for molding the hook elements. In current production machines each cavity of a mold ring has been formed, one at a time, by wire electro-discharge machining (EDM). In the wire EDM process, an electrical discharge between a wire and the plate removes material from the plate while the wire is moved along a specified path to cut a profile through the mold plate. The minimum radius arc that can be cut is determined by the radius of the EDM wire.

Molten resin is forced into the mold cavities, tending to raise the temperature of the mold rings. In practice of the Fischer method, a fluid coolant is circulated through cooling passages within the barrel on which the rings are mounted to remove the heat from the rings. In this way an appropriate temperature of the mold cavities is maintained so that the product becomes sufficiently solid that it can be withdrawn on a continuous basis, typically without opening the mold cavities.

SUMMARY OF INVENTION

Given the large capital costs of the equipment and the need to form improved products, it is desirable to find improvements for implementing the Fischer machine and for molding very small fastener elements.

According to one aspect of the invention it has been realized that because the cooling device has been a separate member from the mold rings, the speed with which heat can be removed is detrimentally affected by resistance to heat transfer at the interface between rings and cooling device. We realize that even in areas in which direct contact between the rings and the cooling device may occur, the resistance to heat transfer caused, e.g. by microscopic surface imperfections, can adversely limit operation of the process. Furthermore, we realize that manufacturing tolerances of the rings and cooling device, and the manner in which they are assembled, result in small nonuniform air gaps between various portions of the ring and cooling device surfaces. These act as detrimental thermal insulators that produce non-uniformities.

We have realized that nonuniform cooling, non-uniformities in the product produced, limitations on the speed of operation, and other drawbacks can be overcome by eliminating interfaces between the cooling medium and the rings of the mold roll.

According to an aspect of the invention, fluid cooling passages are defined in the mold rings themselves and means are provided to prevent leakage of the cooling fluid between the individual rings.

The invention enables the temperature of the mold cavities to be maintained more uniformly around and along the mold roll even at high speed operation, thereby achieving advantages in product quality and throughput.

According to a further aspect of the invention, the means to prevent leakage at the mating rings comprises an array of axially extending tie rods that apply significant compressive force between the rings of the stack. Besides creating a sealing effect between the faces of mating rings at the aligned coolant passages, this axial compression is found to be important in improving the bending resistance of the assembled roll. This enables uniform and tightly controlled thickness of the base layer of the product to be achieved. In turn, this enables production of thinner base layers. This can lower product cost and achieve highly flexible products that are useful, for example, on curved or flexing surfaces. The improved stiffness of the mold roll further enables the use of longer mold rolls and improved machine geometries for producing wider products.

According to one aspect of the invention, a molding apparatus useful for continuously forming features of synthetic resin integral with a base has a shaft and a mold roll having an axis and comprising a multiplicity of thin, sheet-form rings of heat-conducting material. The rings each have an inner diameter, an outer diameter, and a substantially circular array of coolant holes. The rings are mounted to form a stack about the axis of the mold roll. At least many of the rings are mold rings, each mold ring having a series of mold cavities disposed at its periphery.

The mold roll features means for axially compressing the stack and an array of fluid passages for liquid coolant. The passages are formed by the aligned coolant holes of each ring, and extend through the roll for cooling the mold cavities via heat transfer from the material of the disks substantially directly to liquid coolant in contact with the edges of the disk material about the holes.

The apparatus also includes means for introducing heated resin to the surface of the mold roll under pressure conditions, filling the mold cavities and forming a base layer integral with features molded in the cavities. Also included in the apparatus is a means for removing the resultant product from the mold roll after the product has cooled to a desired temperature below the temperature of introduction of the resin.

In a preferred embodiment, the apparatus further includes an inlet manifold mounted at a first end of the mold roll for directing cooling liquid into the coolant passages through the rings.

In another embodiment, a return passage communicates with the coolant passages through the rings and extends axially through the roll. Preferably, the return passage is in a shaft upon which the rings are mounted. In a current configuration, a large number of the coolant passages are arranged in a circle adjacent the periphery of the mold roll, preferably about 50 cooling passages disposed within about one-half inch of the periphery of a mold roll with a diameter between about 8 to 12 inches.

In preferred embodiments, the cavities are shaped to form fastener elements for touch fasteners. Preferably, the mold cavities are hook-shaped to form fastener hooks.

In one embodiment the cavities and the holes are of photochemical etched form. In another embodiment, the cavities and the holes are of laser machined form.

In some embodiments, the means for compressing the stack comprises a circumferential array of tie-rods extending through the rings parallel to the shaft and exerting axial compressive force on the aligned rings. In a presently preferred configuration, there are at least 6 tie rods disposed within about 2 inches of the periphery of a mold roll with a diameter of the order of 8 to 12 inches.

Some embodiments include means to maintain subatmospheric pressure on cooling fluid in the passages.

In some embodiments a sealant material is employed in the vicinity of the fluid holes to promote sealing. In some cases the rings are coated on their sides adjacent the fluid holes with sealant material. In some cases the sealant material is fluid-deposited in interstices between the rings. The sealant material is preferably hydrophobic.

In some embodiments the cavities do not extend through the thickness of the ring.

In some configurations the cavities are on a first side of a mold ring. In other configurations the cavities are on both sides of a mold ring.

In some situations the cavities advantageously each have an enclosing face which is substantially concave.

In some embodiments the fluid holes, the inner diameter and the outer diameter of the mold ring are of photochemical etched form extending through the thickness of the ring.

In the presently preferred embodiment the apparatus also has a pressure roll positioned in proximity to the mold roll to form at least a broad surface of the base. The pressure roll has a circular array of passages for liquid coolant, with the passages extending through the roll for cooling the periphery of the pressure roll via heat transfer from the material of the roll substantially directly to liquid coolant in contact with the inner surface of the passages.

In some embodiments the pressure roll also has mold cavities disposed at its periphery.

According to another aspect of the invention, a method of forming a mold roll for forming fastener elements for touch fasteners is provided. The mold roll comprises a stack of thin, sheet-form mold rings of heat-conducting material having an inner diameter and an outer diameter, each ring having a circular array of holes near its periphery. At least some rings are mold rings, each having a series of mold cavities disposed at its periphery. The method includes forming the cavities and holes, and stacking the rings in alignment such that the aligned holes form coolant passages through the mold roll. The passages extend through the roll for cooling the mold cavities via heat transfer from the material of the disks substantially directly to liquid coolant in contact with the edges of the disk material about the holes.

In some embodiments, forming the cavities and holes is performed by a photochemical etching process. In some other embodiments, forming the cavities and holes is performed by a laser machining process.

According to another aspect of the invention, a method of molding an article comprised of synthetic resin includes providing the apparatus described above, filling the mold cavities with heated resin under pressure conditions while passing cooling liquid through the cooling passages, and removing the resultant product from the mold roll after the product has cooled to a desired temperature below the temperature of introduction of the resin.

According to another aspect of the invention, a method of aligning a multiplicity of thin, disk-shaped mold rings, each having an array of aligning holes and an outer circumferential surface, to form a mold roll, is provided. The method includes 1. providing an alignment shell defining a circular aligning surface, and at least one aligning bar;
2. stacking the rings together to form a stack, each ring being supported on its outer circumferential surface by the aligning surface, with the aligning bar extending through a the aligning hole in each ring;
3. axially compressing the stack of rings to maintain the radial alignment provided by the circular aligning surface; and
4. removing the aligned stack of rings from the alignment shell.

We have also realized that cavities for molding fastener elements, especially fastener elements with small features (e.g., hooks with sharp tips), may be formed by laser cutting methods. According to another aspect of the invention, a method of making a mold with fastener element-shaped cavities is provided. The method includes forming mold plates from flat plate stock by laser-cutting each plate to form an array of mold surfaces that extend inwardly from an edge of the mold plate for defining respective fastener element-shaped cavities.

Certain preferred embodiments of the method of the invention include: stacking the mold plates with their edges aligned to form a surface of a mold having rows of fastener-shaped mold cavities; laser-cutting coolant holes through the thickness of the plates at locations spaced from their edges; preferably, aligning the holes during the stacking to form coolant passages.

In some cases the mold includes round mold plates with laser-cut outer edges; preferably, the mold plates are axially stacked to form a mold roll. In some other cases, the mold defines a closeable and openable mold cavity for injection-molding of part.

In certain preferred embodiments, the mold surfaces define fastener element features having end radii of less than about 0.001 inch; preferably, less than about 0.0005 inch.

In a particularly preferred embodiment, at some of the fastener-shaped mold cavities are formed by the mold surfaces of two or more adjacent, stacked mold plates.

In certain embodiments, the laser-cutting is controlled to produce mold surfaces extending through only a portion of the thickness of their respective mold plates; preferably, the mold surfaces are concave. In other embodiments, at least some of the mold surfaces extend through their respective mold plates; preferably, these surfaces are generally parallel to the surface of the mold.

For greater efficiency, the mold surfaces of a plurality of mold plates can be simultaneously formed by laser-cutting.

In some cases, forming the mold plates include, after laser-cutting the mold surfaces, smoothing the mold surfaces, such as immersion in a chemical etchant.

According to another aspect, the invention provides a mold plate produced by laser-cutting, having any number of the features heretofore described with respect to the method of the invention.

The invention may provide one or more advantages. For example, the invention is particularly suitable for forming small fastener elements (e.g., elements having an overall height smaller than 0.020 inch) with extremely small tip radii (e.g., less than 0.001 inch). The outer edge of a mold plate and the mold surfaces around the edge can be simultaneously formed. Mold plates can thus be cost-effectively produced with accurately-formed mold surfaces.

DESCRIPTION OF THE PREFERRED EMBODIMENTS

FIGS. 1–14 illustrate equipment useful for the continuous molding of synthetic resin to produce features that are integral with a base sheet, having particular application to the production of fastener elements for touch fasteners and the like.

Figure 1:
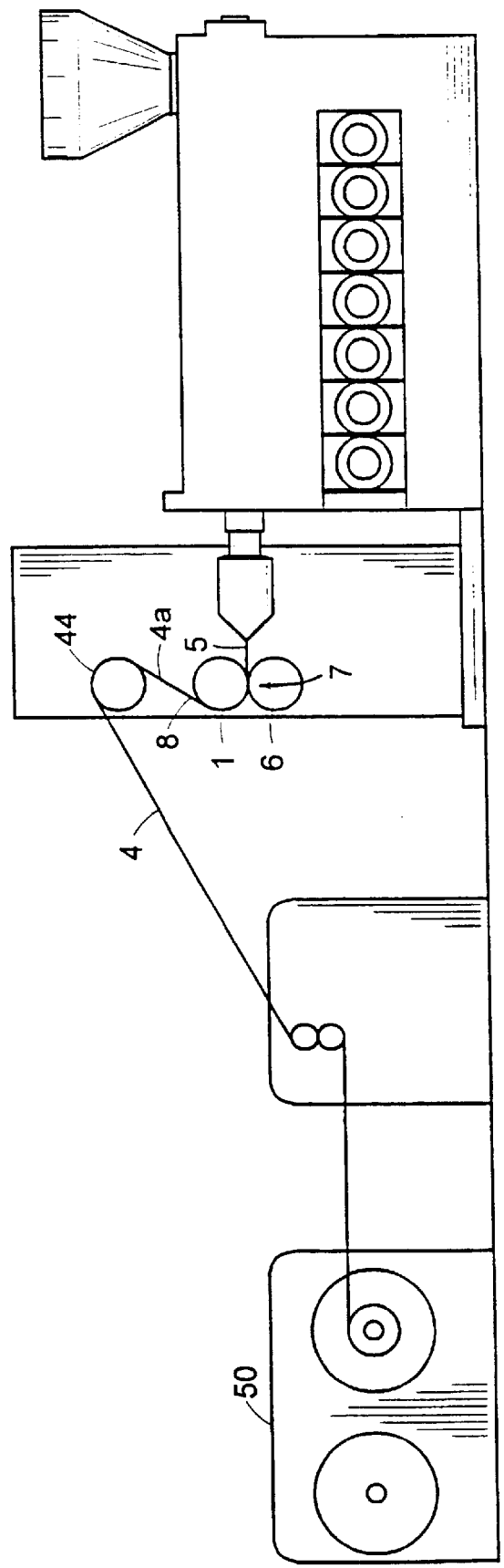
FIG. 1 is a schematic representation of a molding system employing a mold roll.

FIG. 1 shows a molding system using the molding roll for the production of hook elements for touch fastener products. The process and basic machine shown are in accordance with the Fischer techniques as described in U.S. Pat. Nos. 4,775,310, 4,794,028 and 4,872,243, which are hereby incorporated by reference as if they were fully set forth.

The mold roll 1 has miniature hook form mold cavities around its periphery for forming hook projections on an extruded strip-form touch fastener product 4. Mold roll 1 comprises many annular, thin mold rings, for instance of 0.006 to 0.020 inch thickness, held together as a stack. Heat-softened synthetic resin 5 is forced into the cavities under pressure. In a continuous process, the hook-form projections at least partially solidify in the mold cavities, and are then pulled out of the cavities in area 8 after the product has cooled to a temperature at which the projections have solidified sufficiently to be pulled intact out of their mold cavities, remaining integral with the base sheet of the product. The projections are pulled out of mold roll 1 by passing the product around an idler roll 44, and from there to the takeup assembly 50.

Figure 2:
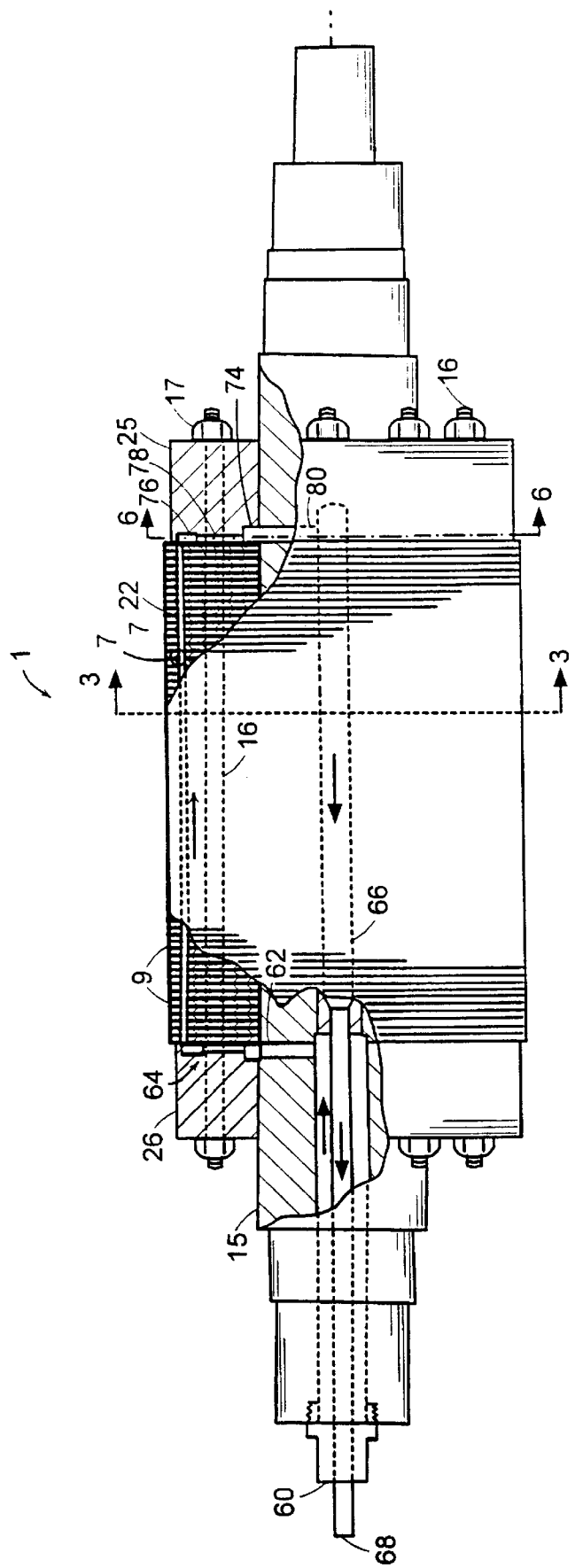
FIG. 2 is a fragmentary view of a mold roll, according to the invention.

FIG. 2 illustrates improvements made by the present invention as they relate to mold roll 1 of FIG. 1. We have realized that substantial axial compression of mold roll 1 near its periphery, as produced by the structure shown in FIG. 2, will so reduce bending deflection of mold roll 1 during the molding process that advantages are obtained. The transverse load applied to the mold roll by the pressure roll 6 (FIG. 1), or by other means for applying resin under pressure, tends to cause mold roll 1 to bend, which can result in uneven product thickness. Stiffening mold roll 1 in the manner shown in FIG. 2 facilitates the production of product 4 with a desirably thinner base, and also enables the use of longer mold rolls 1, producing desirably wider products 4.

In the present invention, the individual mold rings 9 of mold roll 1 are aligned and stacked axially around a common shaft 15. Rings 9 are held together under axial compression by an array of tie rods 16 extending through aligned holes in the stack of rings, running parallel to shaft 15 and tensioned by threaded nuts 17 at each end.

According to this invention, an array of many coolant passages 22 pass through mold roll 1 near the periphery of mold rings 9 for improved cooling of the mold cavities at the periphery of the mold roll. In the presently preferred configuration, cooling fluid is pumped into the mold roll through an annular inlet 60 in shaft 15, and passes through shaft holes 62 and passages 64 of an inlet manifold 26. From the inlet manifold, the coolant passes through the mold roll along cooling passages 22 to an outlet manifold 25 at the other end of the mold roll, which also has passages 64 to direct the coolant through shaft holes 65 and a return passage 66 in shaft 15, to outlet 68.

Figure 3:
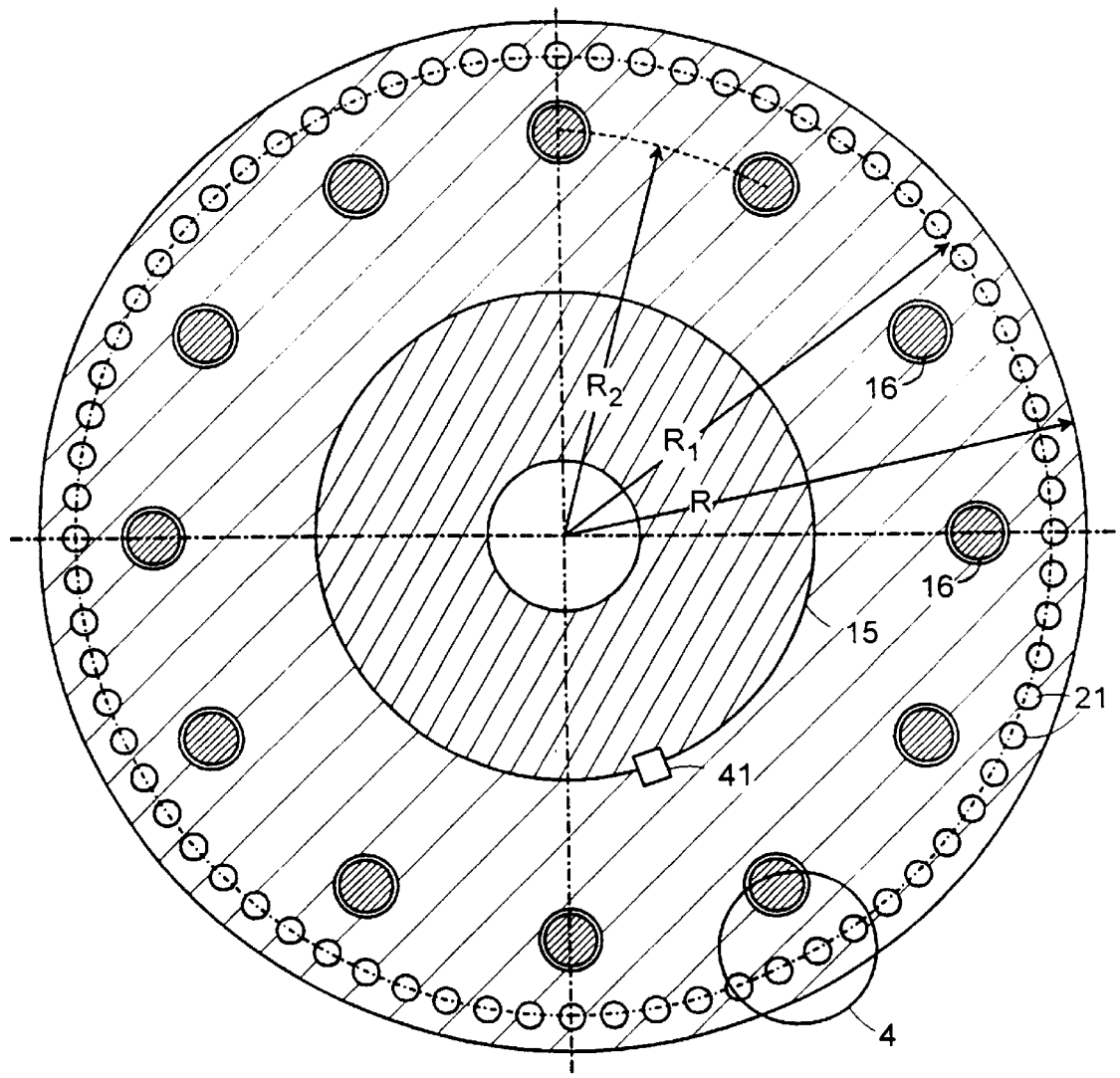
FIG. 3 is an enlarged cross-sectional view, taken along line 3—3 in FIG. 2.

FIG. 3 is a cross-sectional view of the mold roll 1 of Radius R, showing the arrangement of tie rods 16 around shaft 15. In one embodiment, a circular array of eight one-inch diameter tie rods within about 2 to 3 inches of the periphery of a roll of radius R of 5.0 inch, on a bolt circle of radius $R_2$ of 3.8 inch, each tightened to establish substantial preload tension, enable axial compression of the mold roll such as to provide advantageous bending resistance. An array of many, relatively small coolant holes 21 are also seen near the periphery of the mold ring at radius $R_1$. The coolant holes 21 in each ring are aligned to form the cooling passages 22 extending through the assembled mold roll 1 (FIG. 2). For a mold roll radius R of about 5.0 inches, an array of about 60 one-quarter inch diameter coolant holes, arrayed on a radius $R_1$ of about 4.75 inches, provide improved temperature consistency around the mold roll. The axial compression of the mold roll by the tensioned tie rods 16 establishes a degree of thermal contact between the faces of the rings and serves to keep liquid coolant within coolant holes 21 from leaking between mold rings 9. A key 41 is employed to transfer driving torque from shaft 15 to the stacked mold rings.

Figure 4:
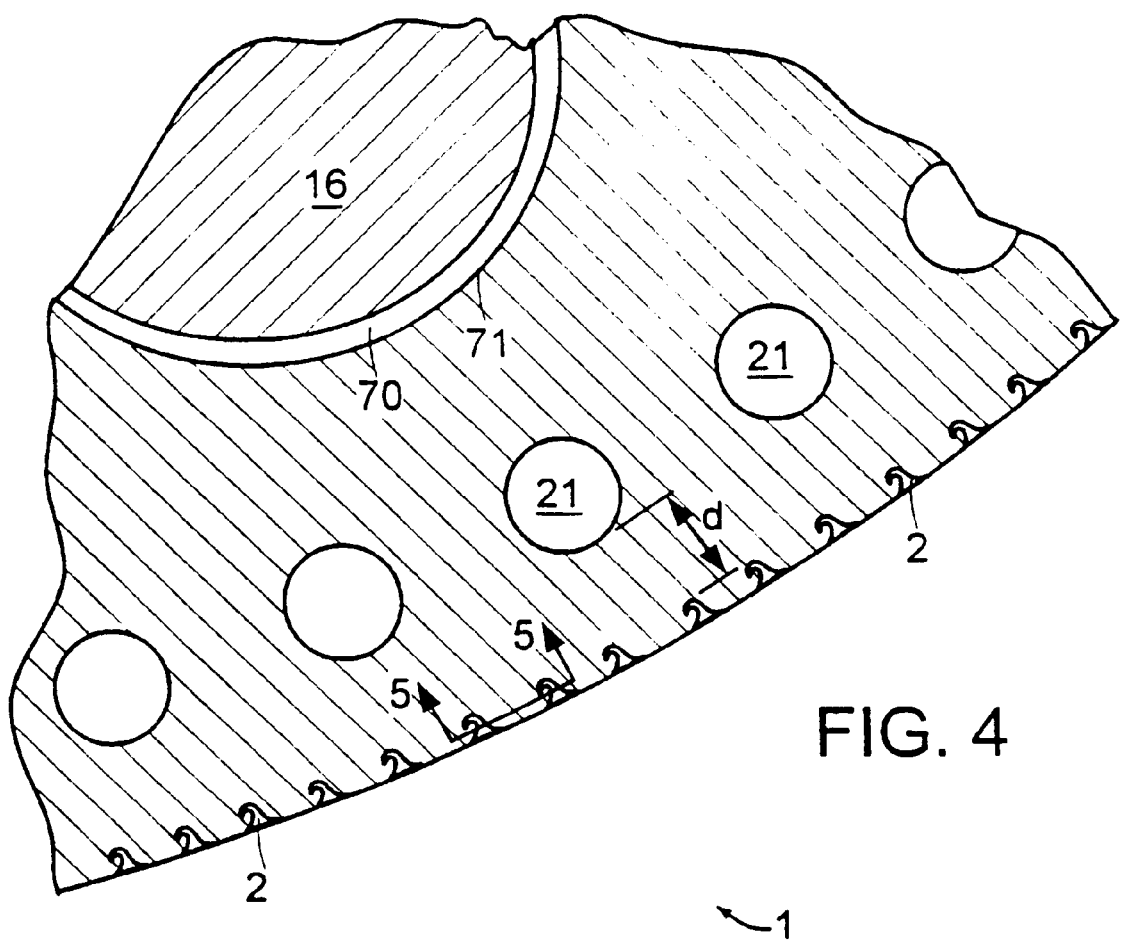
FIG. 4 is an enlarged view of area 4 in FIG. 3.

Referring to FIG. 4, the mold cavities 2 near the periphery of mold roll 1 are shaped to form fastener elements integral to a base sheet. These mold cavities 2 form features of about 0.005 to 0.100 inch in height, and on the order of 0.005 to 0.100 inch wide. For improved cooling, coolant holes 21 are in close proximity to mold cavities 2, within a distance d of, for instance, 0.2 inch. Also visible in this view is a gap 70 between tie rod 16 and the wall of an associated hole 71 through the mold roll. This gap enables improved mold ring alignment, as will be discussed later.

Figure 5:
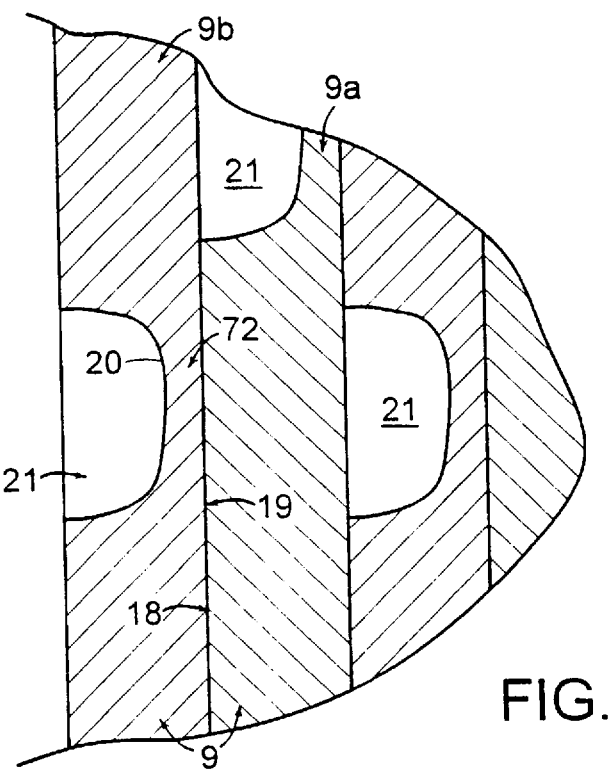
FIG. 5 is an enlarged cross-sectional view, taken along line 5—5 in FIG. 4.

As seen in FIG. 5, in certain circumstances mold cavities 2 are formed such that they do not extend through the entire thickness of a mold ring 9. With the mold cavities thus formed, mold rings 9 are stacked directly against one another, with the open surface 18 of one ring, for instance ring 9a, against the closed surface 19 of the next ring, for instance ring 9b, which forms a side of the mold cavities in ring 9a.

Figure 5A:
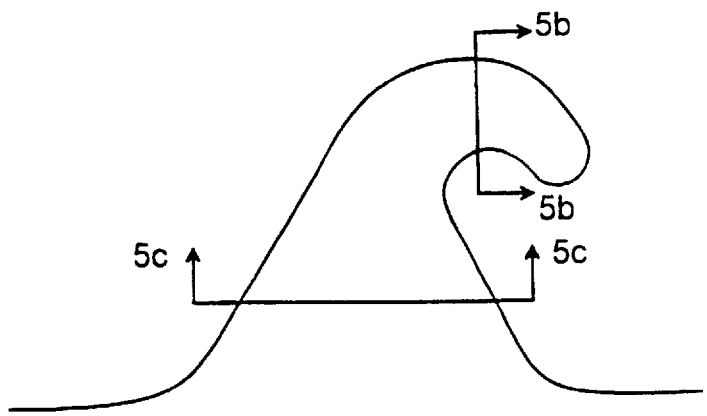
FIGS. 5A through 5C are enlarged views of a preferred embodiment of a hook feature formed by a cavity of the mold roll.
Figure 5B:
Figure 5C:

An advantage of forming mold cavities 2 such that they do not extend through the thickness of mold ring 9 is that they may be used to form features with at least one curved side, formed by a concave surface 20. The resulting tapered and convex nature of the hooks, as shown in FIGS. 5A through 5C, can contribute to the penetrability of the hooks into shallow loops, such as presented by non woven fabrics. In the case of extremely small hooks in close rows, the portion 72 of the mold ring that functions as a spacer between rows of hooks adds thickness to the ring and makes it easier to handle during fabrication and assembly.

In other embodiments (not shown), the mold cavities extend through the thickness of the mold rings. In these configurations, spacer rings void of mold cavities are stacked between mold rings to enclose the mold cavities that are otherwise defined in the mold rings. In yet another embodiment, mold cavities are formed on both sides of some mold rings, the array of mold cavities on the two sides of the ring being circumferentially offset to avoid interference between mold cavities on mating rings. In another preferred embodiment a mold cavity for a given feature is formed by accurately aligned cavity portions in two or more mold rings to form a single mold cavity.

Figure 6:
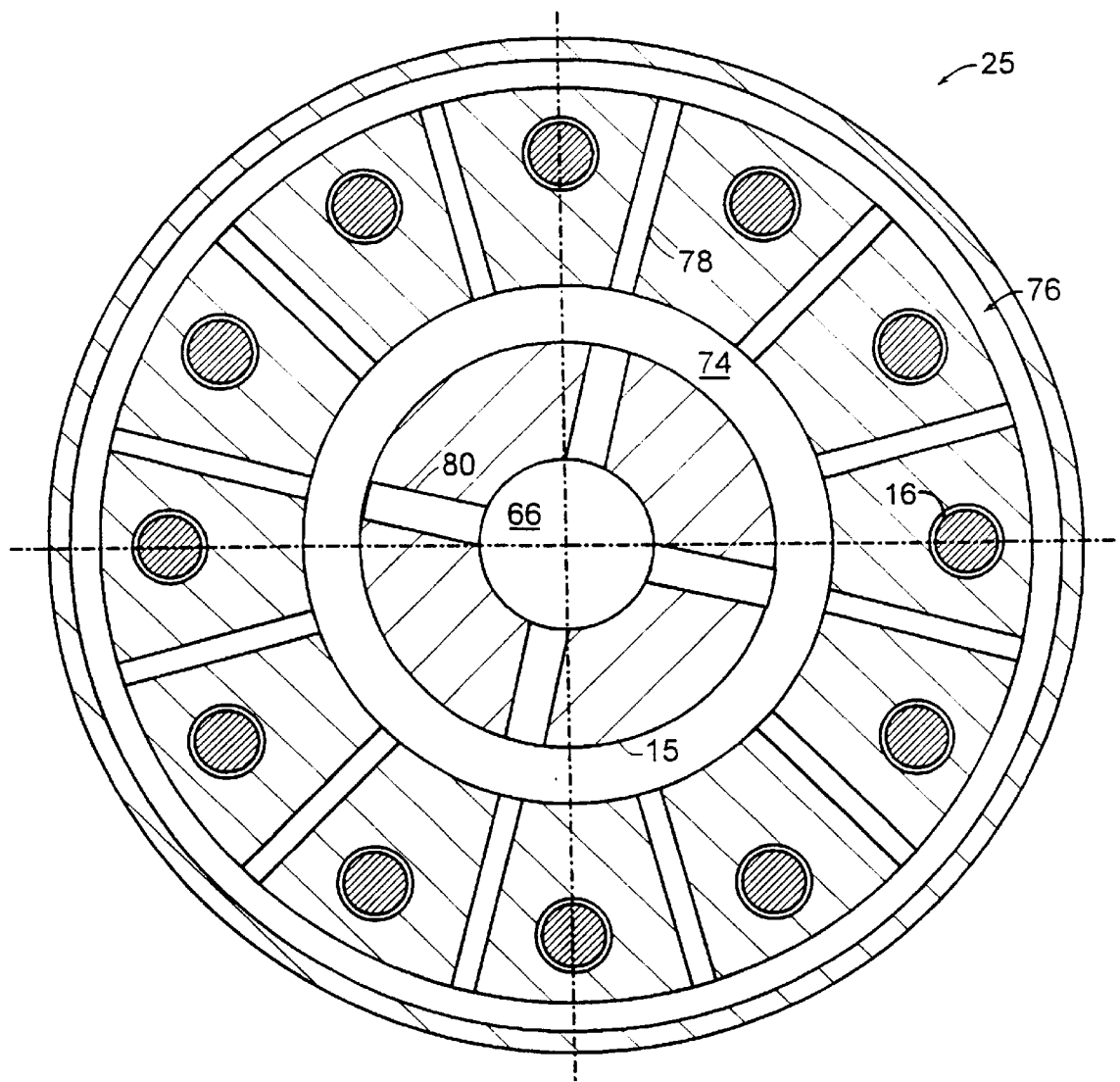
FIG. 6 is an enlarged cross-sectional view, taken along line 6—6 in FIG. 2.

Referring to FIG. 6, the ring-facing side of exhaust manifold 25 has an inner and an outer recess, 74 and 76, respectively, connected by several radial grooves 78. Recesses 74 and 76, and grooves 78, form a hydraulic passage (e.g. 64 in FIG. 2) to hydraulically connect the coolant passages in the mold rings with shaft 15. Holes 80 in shaft 15, similar to shaft holes 62 near the inlet manifold 26 (FIG. 2), enable coolant to flow from inner manifold recess 74 to return passage 66.

Figure 7A:
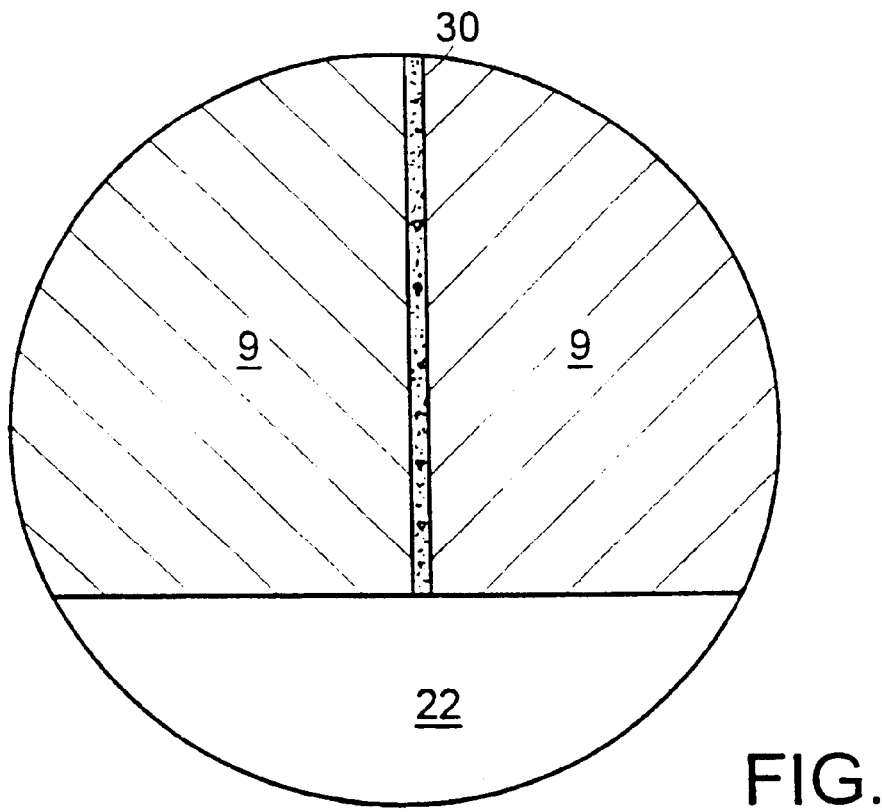
FIGS. 7A through 7C are enlarged views of preferred embodiments of area 7 in FIG. 2.
Figure 7B:
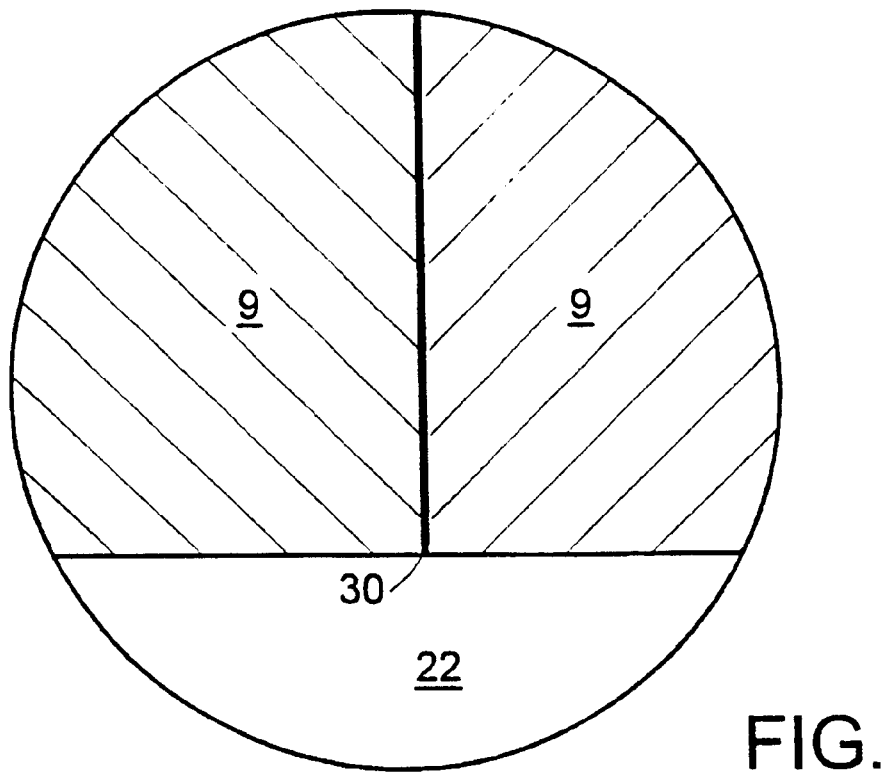

Referring to FIGS. 7A and 7B, sealant material 30 is employed to contribute to sealing cooling passages 22 within mold rings 9 in a preferred embodiment. Sealing is augmented by axial compression of the mold roll by the tie rods. In a presently preferred embodiment, sealant 30 is placed along the surfaces of mold rings 9 before assembly, as shown in FIG. 7, and is compressed by the axial compression of the mold roll. In another embodiment (FIG. 7B), the sealant is fluid-deposited, e.g. as carried by automobile radiator repair fluid, by the leakage of coolant into any interstitial space between mold rings 9 near coolant passages 22. Sealant material 30 is also placed at each end of the stacked roll of mold rings 9, near the location of tie rods 16 and shaft 15, to seal against leakage from manifolds 25 and 26 (FIG. 2). Use of a hydrophobic material as sealant 30 helps to restrict the migration of water-based coolant between the mold rings.

Figure 7C:
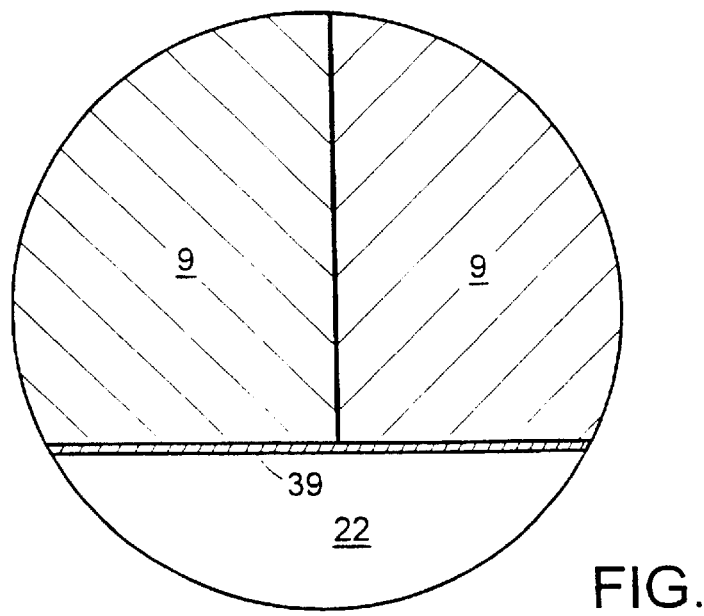
Figure 8:
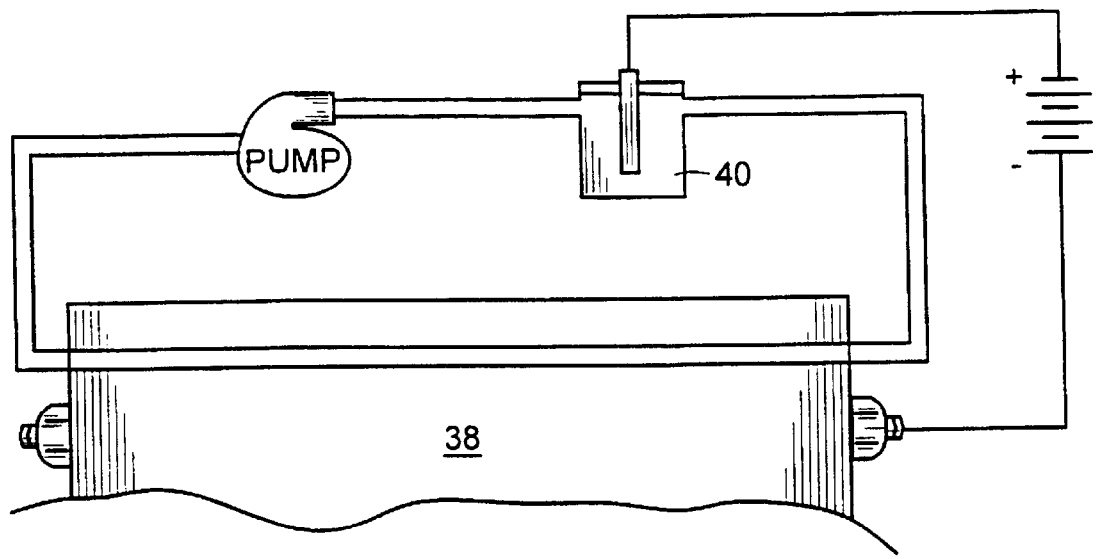
FIG. 8 is a schematic view illustrating a process for forming the structure of FIG. 7C.

Referring to FIG. 7C, in another embodiment of the invention a thermally conductive material 39 is deposited on the surface of the cooling passages 22, and acts as a sealant to keep the coolant from leaking between mold rings 9. This conductive material may be deposited in an electroplating process as shown in FIG. 8 after the mold rings 9 are stacked together and compressed. In the electroplating process, the compressed stack 38 of rings serves as one electrode as electroplating fluid 40 is circulated through the cooling passages 22. In this manner a layer of plating material (e.g. thermally conductive material 39) is deposited along the surface of cooling passages 22. Sufficient axial compression of stack 38 during this process, along with an appropriate viscosity of fluid 40, keeps the fluid 40 from migrating between the mold rings, although a small amount of migration of fluid 40 between rings 9 is not adverse to the function of the assembled mold roll.

Although not shown, other seals are also employed as required to maintain the integrity of the cooling system, such as static seals at the interfaces of manifolds 25 and 26 to shaft 15 and to the stack of mold rings, and dynamic seals between the ends of shaft 15 and the stationary plumbing.

Figure 9:
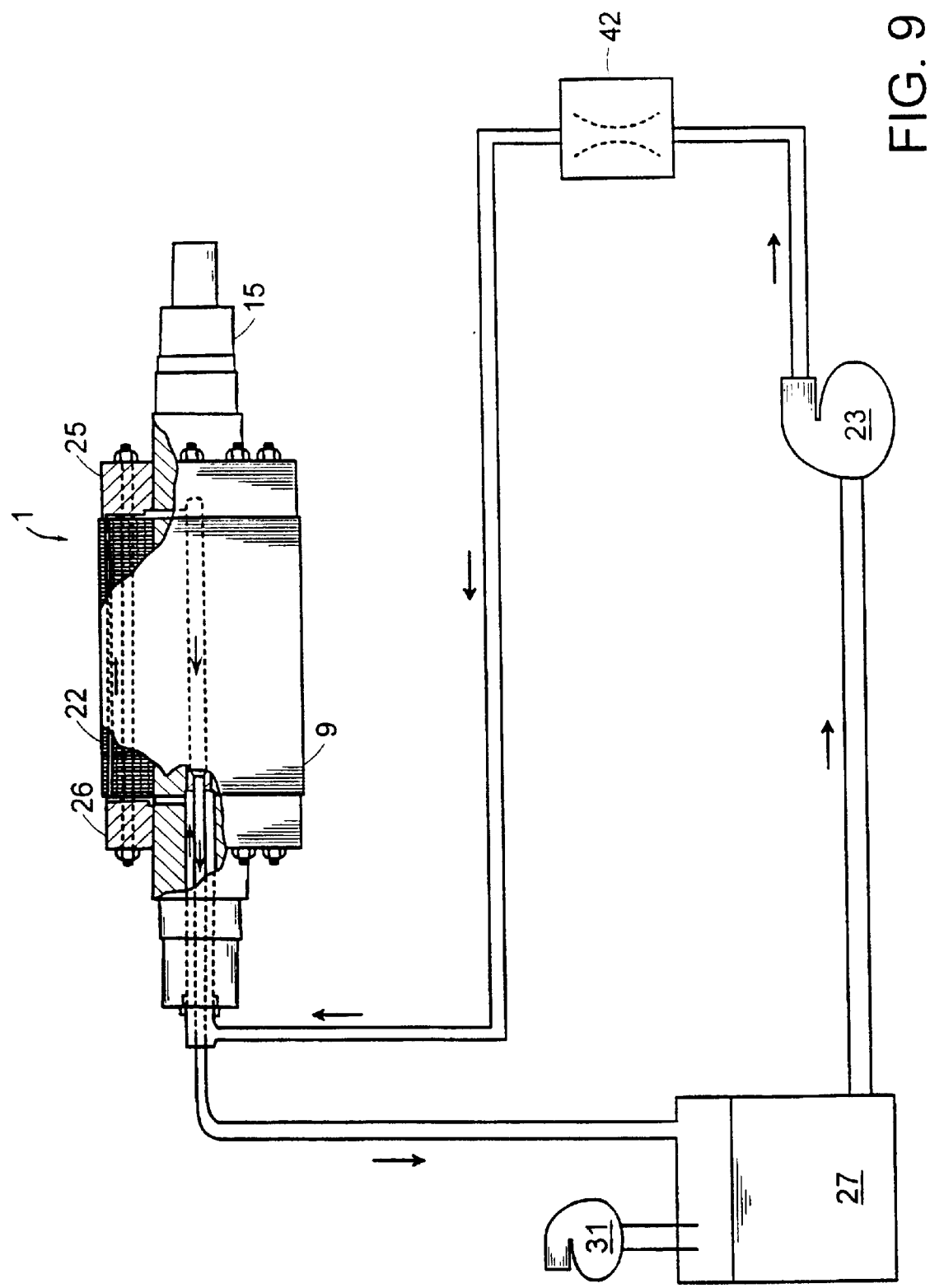
FIG. 9 is a schematic illustration of a cooling system.

Referring to FIG. 9, coolant is circulated through the cooling system by a pump 23, and flows into mold roll 1, through inlet manifold 26 in communication with all of the cooling passages 22, along cooling passages 22, through outlet manifold 25, into shaft 15 and back to a cooling reservoir 27. To reduce the effect of any leaks between the mold rings, in certain preferred embodiments the coolant system incorporates a vacuum source 31 and/or other means, including an upstream flow restriction 42, to maintain a subatmospheric pressure within cooling passages 22.

Figure 10A:
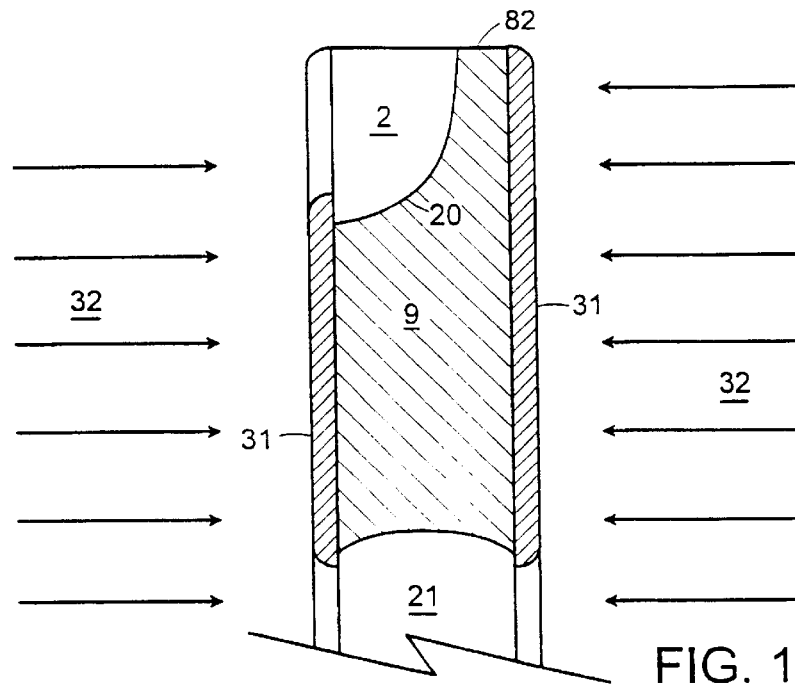
FIGS. 10A and 10B illustrate preferred methods of ring manufacture.

Referring to FIG. 10A, in certain preferred embodiments a photochemical (PC) etching process is used to form mold cavities 2, coolant passages 22, and other features, such as an alignment keyway for key 41 (FIG. 3). In the embodiment illustrated, mold cavities 2 do not extend through the thickness of mold ring 9. In the ring fabrication process, an etch-resistant photoresist material 31 is fixed to the surfaces of a sheet 82 of mold ring material of the proper thickness and then developed by exposure to ultraviolet light through a mask (not shown) that is cut to produce the desired final surface configuration, including preferably the finished inner and outer diameters of the mold ring. The undeveloped photoresist material in areas beneath the mask remains fixed to the sheet as the developed material 31 is removed. Etching fluid 32 is then sprayed on the surfaces of the sheet, etching the areas not covered by etch-resistant material 31. When the etching process is complete, material 31 is removed from the finished mold ring 9. As a natural result of the PC etching process the etching rate is slower at the bottom of the mold cavity, due in part to the dilution of the etching fluid, thus creating a concave surface 20 at the bottom of molding cavity 2, and useful undercuts (not shown) in some arrangements.

In other preferred embodiments, especially those involving large hook elements and other features, the mold cavities are formed with PC techniques by etching through the thickness of the sheet, either from one side or by etching through both sides.

An advantage of the PC process is that all of the features on a mold ring 9, including the inner and outer diameters, coolant holes 21 and mold cavities 2, can be advantageously produced at the same time or in an appropriate sequence, using precisely positioned masks in accordance with general photo-lithographic techniques, as employed e.g., in the semiconductor industry. In some cases, for instance, one side of a sheet of mold ring stock is appropriately masked to etch all of the features to the depth of the mold cavities 2, and the other side of the sheet is masked by a system that holds registration to complete the etching of the inner and outer diameters and coolant holes 21 through the thickness of mold ring 9.

Figure 10B:
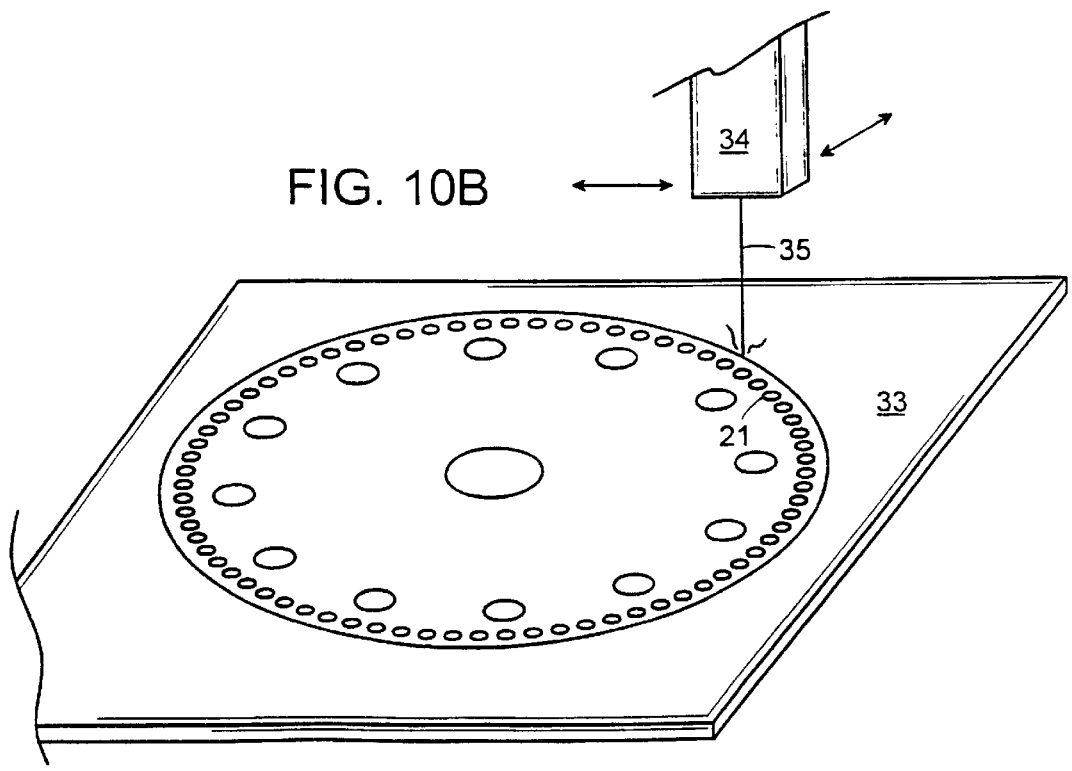

Referring to FIG. 10B, a laser machining technique is employed in other embodiments to produce mold rings 9 from a sheet 33 of ring stock. Using the laser machining process, hook profiles cut through the thickness of sheet 33 are readily formed, and these can be advantageously of smaller size than those previously formed using wire EDM methods. For instance, hook elements as short as 0.005 to 0.008 inch, with appropriately small radii of 0.001 or 0.002 inch, can be formed. To produce a mold ring by the laser machining process, sheet 33 of the proper thickness is fixtured to be presented to a laser head 34. A beam 35 of energy from laser head 34 removes material from sheet 33, according to a programmed pattern, to produce a finished mold ring. Head 34 is typically mounted on a positionable base, such that the motion of the head can be controlled as desired to form the features of the finished ring. Transverse X-Y motion of a table carrying sheet 33 may also be employed. The depth of the groove produced by the effect of the beam 35 on the sheet 33 is a function of the intensity or power of the beam 35, the material properties of the sheet 33, and the speed at which the head 34 or sheet 33 is moved. Varying these parameters can produce the desired depth of the mold cavities, while also cutting through the entire thickness of the sheet to form the coolant holes 21, the holes 71 for the tie rods, and the ring inner and outer diameters. In the case where a through-cut is not desired, particularly close control of the deposition of laser energy is maintained to limit the vaporization of the ring material to produce, for example, the general cavity shape of FIGS. 5A, 5B and 5C.

Figure 11:
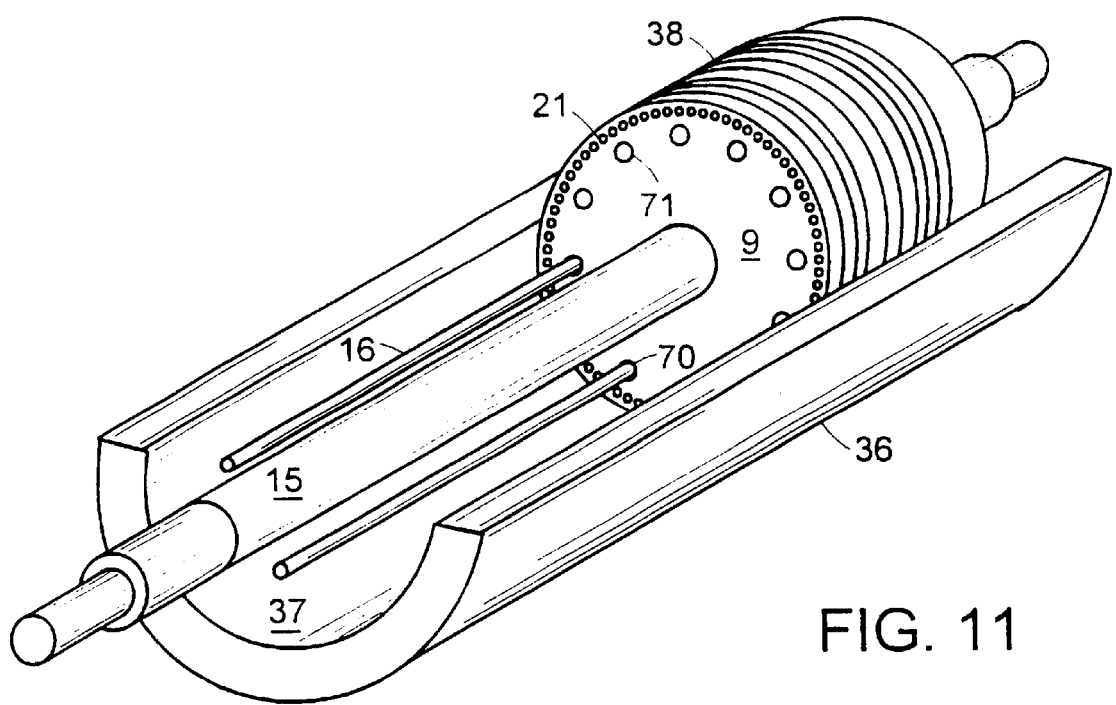
FIG. 11 illustrates a method for aligning and assembling the mold roll.

Referring to FIG. 11, the structure of the mold roll according to the invention enables an improved mold ring alignment method, using a radial alignment shell 36 and one or more orientation bars 37. Preferably, the rings are sequentially stacked about shaft 15 which is concentrically aligned to shell 36 by the inlet and outlet manifolds (i.e., 25) or other means. Tie rods 16 (or other alignment bars inserted through holes 71) align holes 71 as rings 9 are stacked, also aligning coolant holes 21 in each ring to form the cooling passages of the assembled roll. Particularly useful in the assembly of a mold roll for the production of fastener products with good base thickness consistency, the inner surface 37 of shell 36 aligns the outer surface of the rings, such that the assembled roll has a very cylindrical circumference for producing an even base thickness in the molded fastener product. In addition, the stack of rings is concentrically aligned with shaft 15. The gap (70, FIG. 4) between tie rods 16 and the inner edges of holes 71 enables each ring to be radially aligned by surface 37 of shell 36 without radial restraint from tie rods 16. After rings 9 are stacked, the other manifold is set in place and the stack 38 is compressed and removed from alignment shell 36.

In an alternative embodiment (not shown), the rings are aligned with an expandable center shaft.

Among the advantages of the improved cooled mold roll and methods of manufacture of the present invention, as relates to the production of strip-form plastic products, is that the invention enables faster production rates and therefore lower unit production costs, more accurately formed products, and products with finer features and higher flexibility of the supporting base layer.

In molding machines that employ substantially the Fischer process, other systems from that shown in FIG. 1 may introduce pressurized heat softened or molten synthetic resin to the surface of the mold roll under conditions that fill the mold cavities and form a base layer integral with features molded in the cavities. For instance an extruder may be moved closer to the roll from what is shown in FIG. 1 and the extruder nozzle may confine the resin so that it is applied with pressure directly to the mold roll, filling the cavities and forming a base layer of desired thickness. In such a configuration, the structure of the mold roll of the invention can advantageously stiffen and align the roll for improved base thickness consistency, enabling the production of thinner bases, and wider products.

Figure 12:
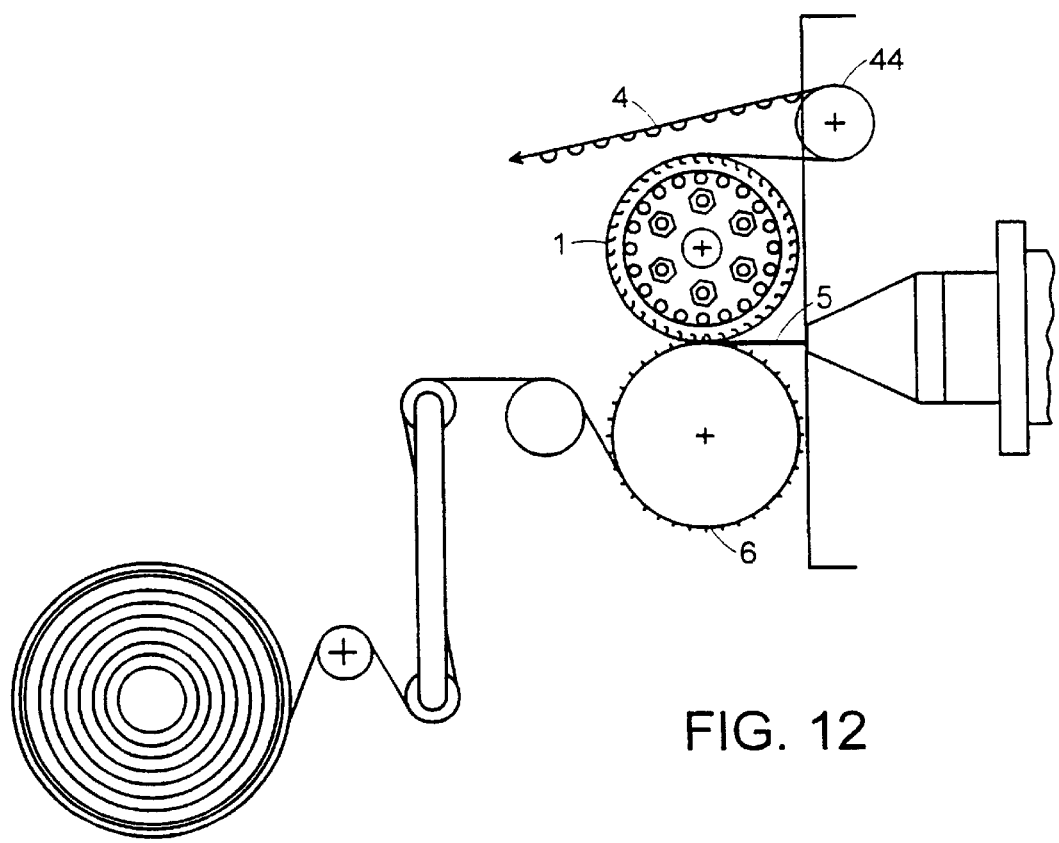
FIGS. 12 and 13 illustrate machines and methods for making various fastener products utilizing the mold roll.

FIG. 12 shows a mold roll according to the invention arranged to make a product with molded fastener elements on one side and engageable loops on the other side, in accordance with the teachings of U.S. Pat. Nos. 5,260,015 and 5,518,795, which are hereby incorporated by reference as if fully set forth herein.

Figure 13:
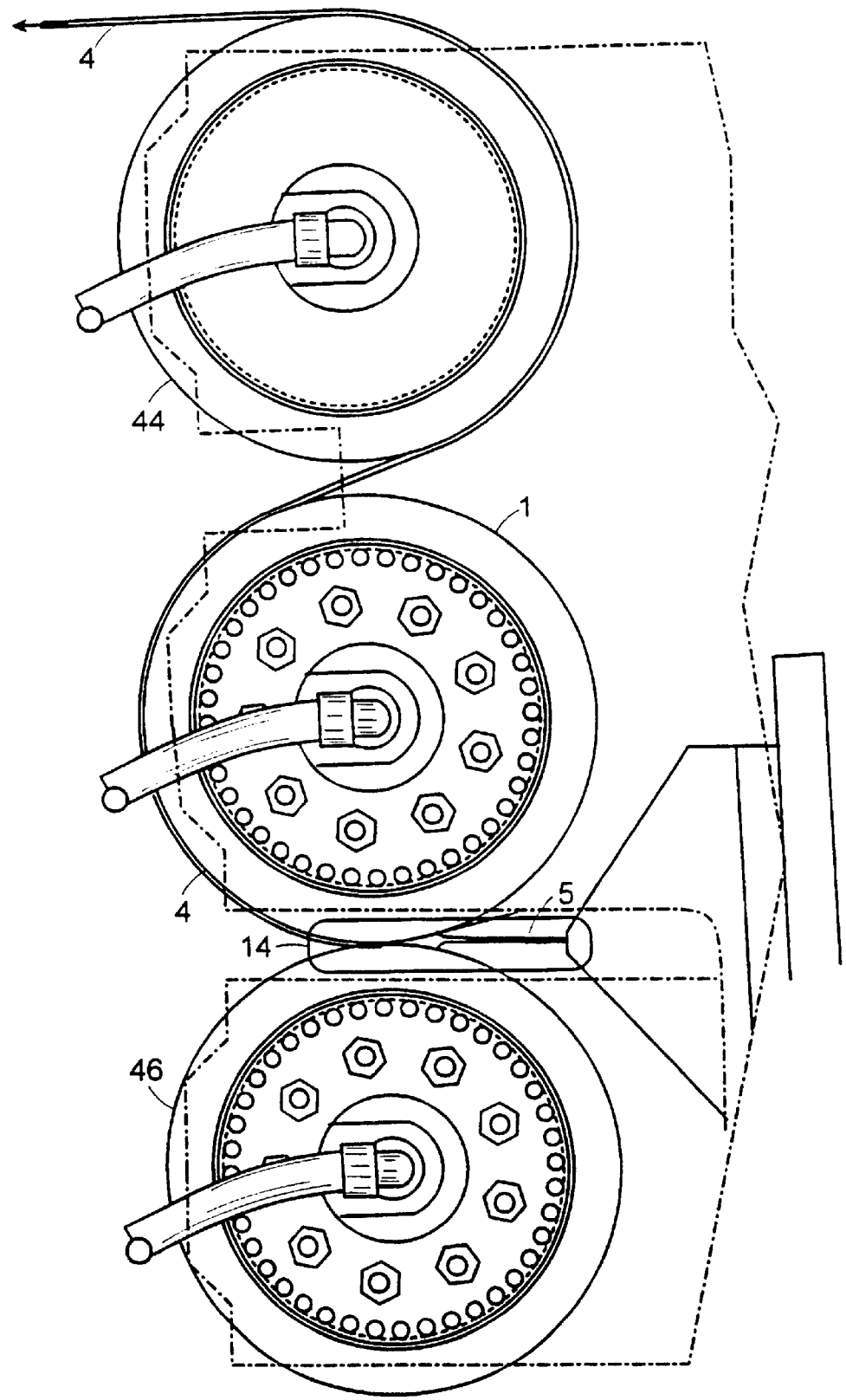
Figure 14:
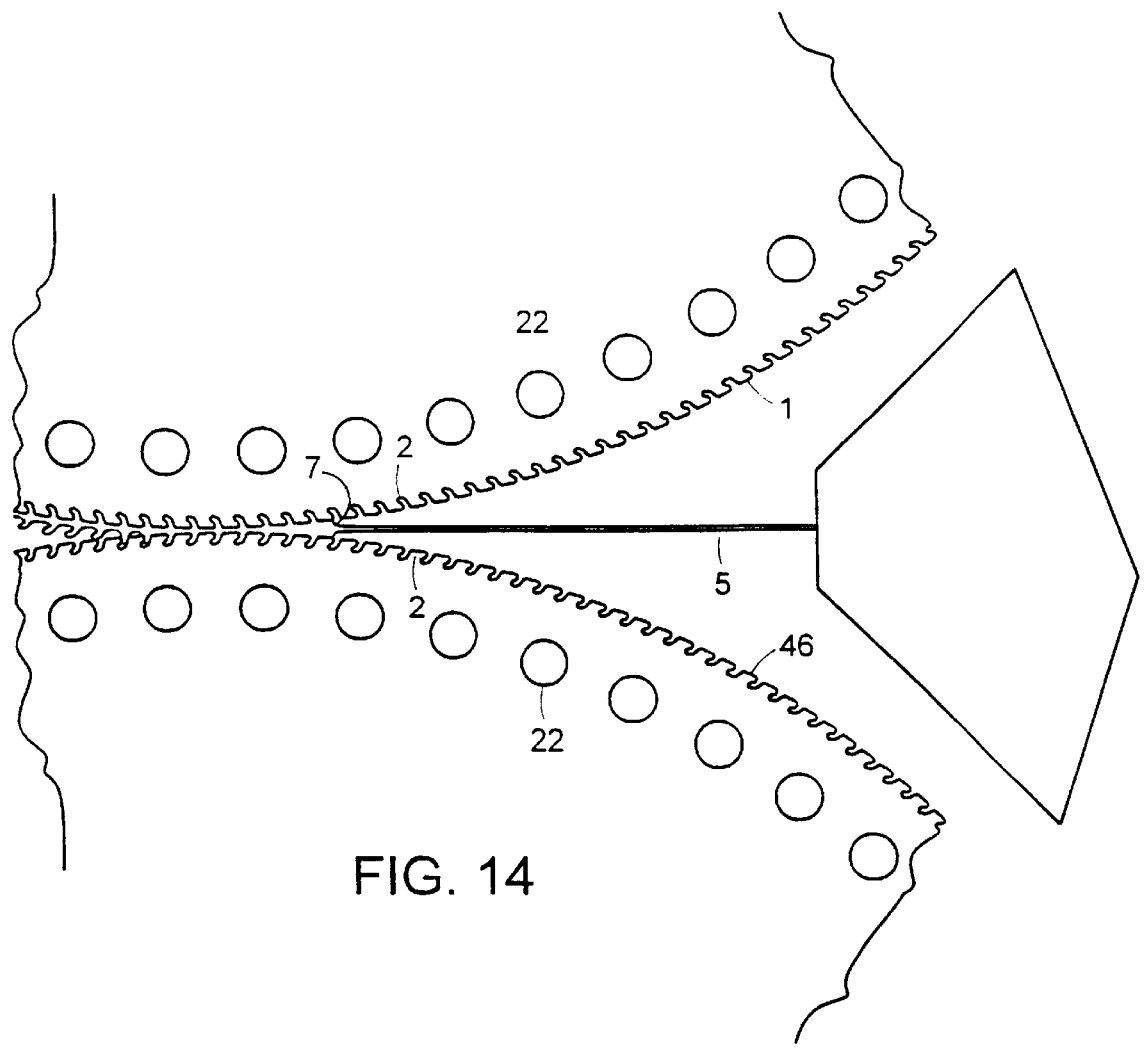
FIG. 14 is an enlarged view of area 14 in FIG. 13.

FIG. 13 shows mold rolls according to the invention employed in making a so called back-to-back product in accordance with the teachings of WO 94/07556, which is hereby incorporated by reference as if fully set forth herein. In this case both mold roll 1 and pressure roll 46 are constructed and cooled in accordance with the invention. As seen in FIG. 14, both rolls have mold cavities to form features on the finished product.

In some cases sufficient cooling can be obtained in the forming area that the product is removed directly from the forming area after being carried for a short distance on the periphery of the cooled mold roll, without need for additional cooling. This may be assisted by employing cooling passages in the pressure roll 6 as well as the mold roll 1, as shown in FIG. 13.

Figure 15A:
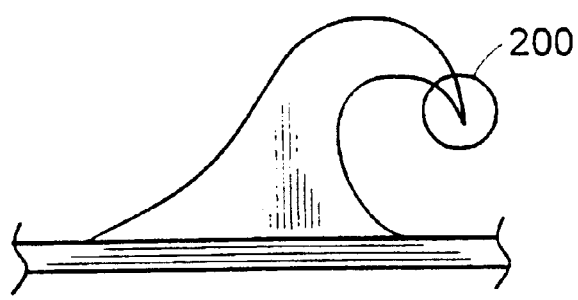
FIG. 15A is a side view of a molded fastener element with a sharp tip.
Figure 15B:
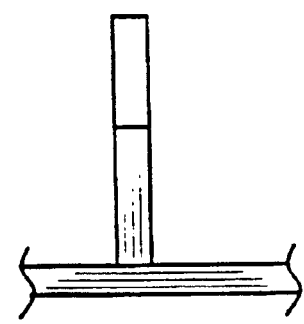
FIG. 15B is a front view of the fastener element of FIG. 15A.
Figure 15C:
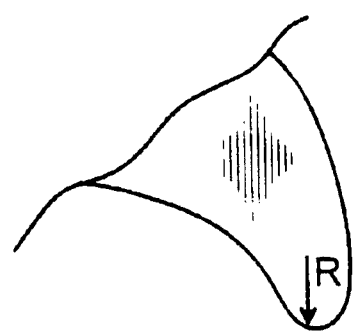
FIG. 15C is a close-up view of area 200 of FIG. 15A.

Shown in FIGS. 15A and 15B is a fine, sharp tip fastener element formed with mold plates fabricated by the laser machining process illustrated in FIG. 10B. Elements with tips having radii, R (FIG. 15C), of about 0.001 inch or less (preferably only about 0.0005 inch), are obtainable with laser-machined molds. Certain advantages are provided by sharp tip fastener elements including penetrability into the loops of engaging loop materials. The sharp tip enables penetration between an engageable loop and the rest of the loop mass of a looped fastener member. Improving the loop-engaging probability of an individual hook of a hook fastener member increases the engagement ratio of an array of hooks, that is, the overall percentage of hooks of the array that, at any given time, engage loops. Higher engagement ratios typically result in better fastener performance.

Figure 16A:
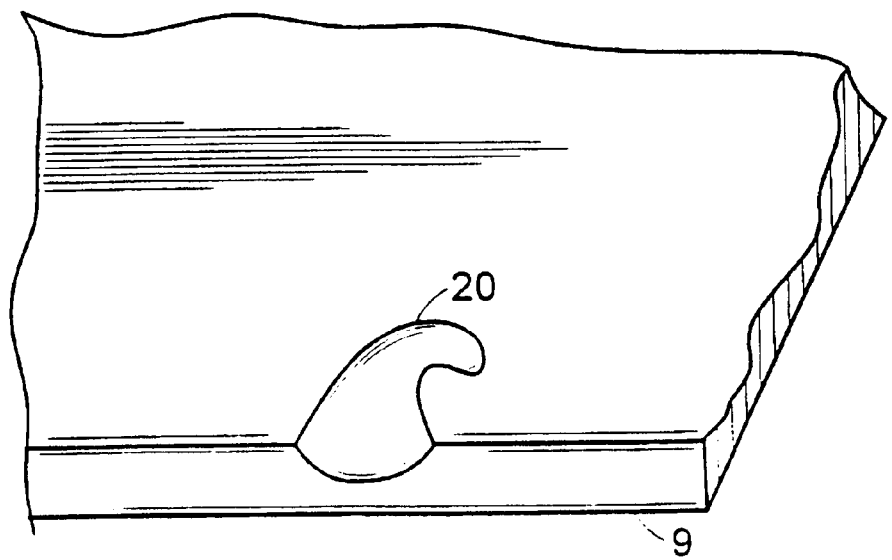
FIG. 16A is a perspective view of a concave mold surface.

As illustrated in FIG. 16A, the laser machining process enables the formation of mold surfaces 20 that do not extend through the entire thickness of mold plate 9. An advantage of forming mold surfaces that do not extend through the mold plate is that they may be used to form fastener elements with at least one convex surface which may contribute to the penetrability of the elements into shallow loops, such as those presented by non-woven fabrics. In this case, particularly close control of the deposition of laser energy is maintained by appropriate machine controls to limit the vaporization of the plate material to produce, for example, the concave mold surface 20 shown in FIGS. 16A and 16B.

Figure 16B:
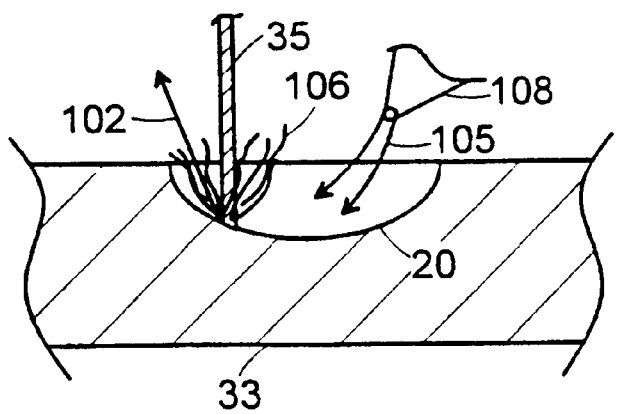
FIG. 16B is a side cross-sectional view of laser machining the mold surface of FIG. 16A.

Referring to FIG. 16B, the depth of the laser cut produced by the effect of beam 35 on sheet 33 is a function of the intensity or power of beam 35, the material properties of sheet 33, and the speed at which the laser head or sheet 33 is moved. Varying these parameters can produce either a concave mold surface of a desired depth (FIG. 16A) or can cut through the entire thickness of the sheet to form mold cavities and/or cooling holes or plate inner and outer diameters. During laser machining of mold surfaces, hot molten debris 106 of plate material is produced. A blower 108 is employed to maintain an air flow 105 sufficient to continually displace debris 106 from the forming area in the general direction indicated by arrow 102. This is especially important when forming concave surfaces not extending through the plate, as in FIG. 16B.

Fastener elements formed with these laser machined surfaces smaller than those previously formed with mold surfaces produced by wire EDM methods. For instance, small fastener elements having an overall height of 0.020 inch, or even smaller elements, for example, having a height of the order of 0.008 inch, are readily produced with cavities formed by this method. Such small hooks can be used for engaging loop materials with low-lying loops as found in non-woven fabrics.

Figure 17A:
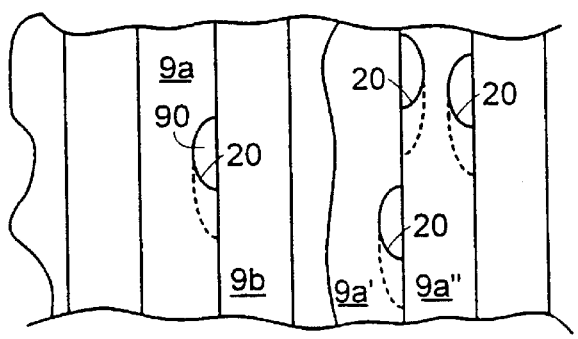
FIG. 17A is an edge view of adjacent mold plates forming a mold cavity with a curved mold surface and an opposing plate side surface.

FIG. 17A shows a mold cavity 90 formed by stacking a mold plate 9a with the laser machined surface 20 of FIG. 16A against the flat side of a spacer plate 9b. Similar cavities are also formed by stacking mold plates 9a' and 9a" together, such that their mold surfaces 20 do not overlap. This arrangement can be used to produce fastener products with particularly high densities.

Figure 17B:
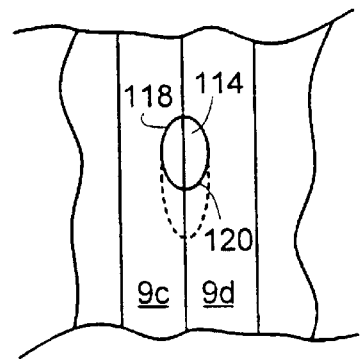
FIG. 17B is an edge view of mold plates forming a mold cavity with two opposing, curved mold surfaces.

In the embodiment shown in FIG. 17B, a mold cavity for a given feature is formed by accurately aligned and cooperating mold surfaces 118 and 120 in two adjacent mold plates 9c and 9d, respectively, to form a single mold cavity 114.

Figure 18:
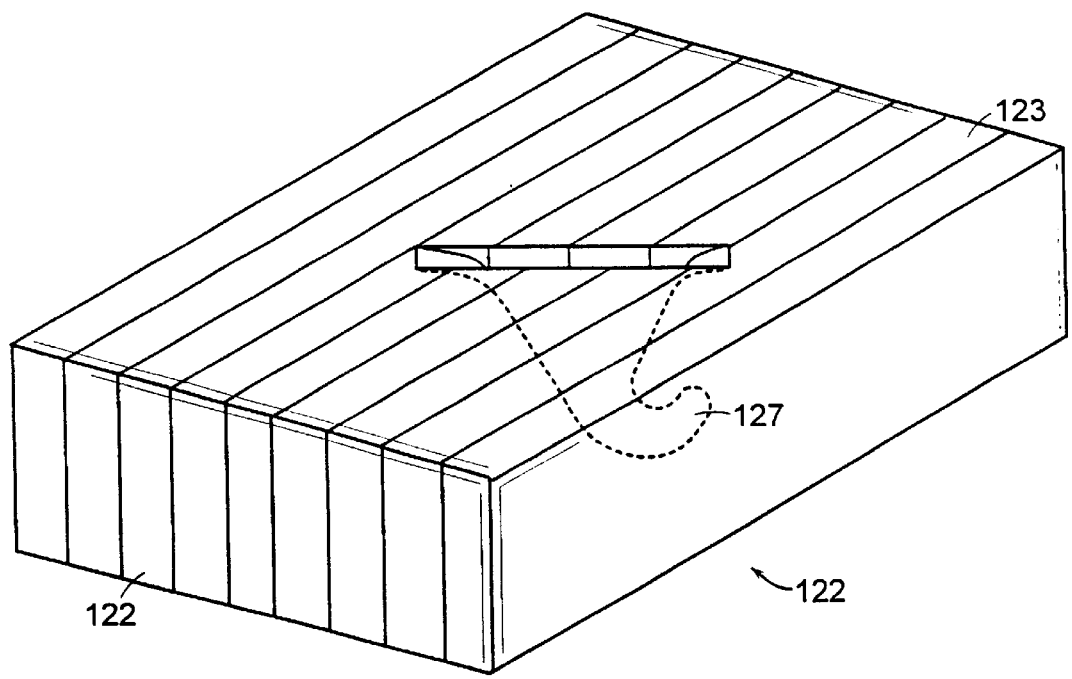
FIG. 18 is a perspective view of an injection mold showing the orientation of a mold cavity diagrammatically.

In FIG. 18, the hook-forming portion of an injection mold 130 for delivering moldable resin to the mold cavities is diagrammatically shown. The moldable resin is injected into adjacent mold cavities 127, thereby forming the fastener elements by injection molding. The injection mold is formed of a series of plates 122 disposed face-to-face to create a flat (or curved) surface 123 having mold cavities. The mold cavities can be formed in one or more plates. After molding, the overall mold opens, the hooks are withdrawn from the mold cavities as the molded piece is removed, and the overall mold closes for another injection cycle. Injection molding can be employed to form the hook members directly on a rigid backing which, in turn, can be attached to a separate part. Injection molding can also be employed to form the hook members integrally with a part, such that the hook members do not need to be later attached to the part.

The moldable resin may be any moldable plastic material depending upon the intended application for the fastener element. Currently, polypropylene is preferred. Nylon, polyesters, polyethylene, propylene, polyethylene and copolymers thereof, or other thermoplastic resins, may also be used.

With laser machining methods, mold surfaces can be cut through the thickness of a mold plate at speeds of up to one circumferential inch per minute. A finished mold plate can typically be machined in less than one hour. In applications when close control of the cavity surface depth is desired, a pulsed laser is preferred.

To provide very smooth surface finishes on laser-machined mold surfaces, such that the solidified hooks are more readily released, the laser-machined mold plates are immersed in a chemical etchant which preferentially removes mold plate material of the microscopic asperities left by the laser-machining process. Finished mold surfaces with a roughness of 63 microinches, for instance, have been found to acceptably release molded fastener elements.

The embodiments are within the scope of the claims. For instance, mold surfaces can be formed on both sides of some mold plates, the array of mold cavities on the two sides of the plate being circumferentially offset to avoid interference between mold cavities on mating plates. Multiple mold plate blanks can also be stacked together, with features extending through the thickness of the plates laser-machined simultaneously through all stacked plates. These and other features and advantages will be understood from the following claims, taken in conjunction with the foregoing specification and accompanying drawings.

What is claimed is:

1. A method of forming a mold roll for forming a sheet-form product having features projecting from one side thereof, the mold roll comprising a stack of thin mold rings with outer circumferential surfaces together forming a peripheral surface of the mold roll, at least some of the rings each defining mold surfaces extending inward from their outer circumferential surfaces to define an array of mold cavities extending from the peripheral surface of the mold roll for unitarily molding features with a sheet-form base formed on the peripheral surface of the mold roll, the method comprising forming said mold surfaces;

stacking the rings together to form an aligned stack, with each ring supported on its outer circumferential surface by an aligning surface of an alignment shell;

axially compressing the aligned stack of rings to maintain radial alignment, as provided by said aligning surface, the outer circumferential surfaces of the rings together forming the peripheral surface of the mold roll; and removing the compressed stack of rings from the alignment shell.

2. The method of claim 1, wherein the mold cavities are shaped to form fastener elements, for molding a touch fastener product having rows of fastener elements integral with and projecting from the sheet-form base.

3. The method of claim 1, wherein the rings also define coolant holes therethrough, the coolant holes being aligned to form coolant passages through the aligned stack of rings near the peripheral surface of the mold roll, for cooling the mold roll in operation.

4. The method of claim 3, further comprising applying a sealant to at least some of the rings to inhibit leakage of coolant from the coolant passages of the aligned stack.

5. The method of claim 4, wherein the sealant is thermally conductive and deposited along the coolant passages in an electroplating process.

6. The method of claim 1, wherein at least some of the mold cavities are defined between at least two adjacent mold rings in the aligned stack.

7. The method of claim 6, wherein at least some of the mold cavities are defined between the mold surfaces of at least two adjacent mold rings in the aligned stack.

8. The method of claim 1, wherein at least some of the mold surfaces extend through the thickness of their respective mold rings.

9. The method of claim 1, wherein each ring defines an angular alignment hole therethrough, the stacking step including placing an angular alignment bar through the angular alignment hole of each ring to angularly align the rings of the aligned stack, and wherein the step of axially compressing the aligned stack maintains such angular alignment of the rings as provided by the angular alignment bar.

10. The method of claim 9, wherein the angular alignment bar comprises a tie rod which is placed in tension to axially compress the stack of rings.

11. The method of claim 10, wherein the angular alignment hole of each plate is one of an array of holes through its associated plate, and wherein the alignment bar is one of an array of tie rods which are all placed in tension to axially compress the aligned stack of rings.

12. The method of claim 1, wherein each ring defines a central hole therethrough for receiving a core mandrel of the mold roll.

13. The method of claim 1, wherein at least many of the rings each have a thickness of between about 0.006 and 0.020 inch.

14. The method of claim 1, wherein each of the rings has a diameter of between about 8 and 12 inches.

15. The method of claim 1, wherein the rings are stacked and compressed between end pieces.

16. The method of claim 15, wherein said end pieces comprise manifolds for circulating coolant through the rings.

17. The method of claim 1, wherein the mold cavities are sized to form features of about 0.005 to 0.1 inch in height and about 0.005 to 0.1 inch in width.

18. The method of claim 1, wherein the aligning surface of the alignment shell is concave and has a curvature adapted to fit the outer circumferential surfaces of the rings.

19. A method of forming a mold roll for forming fastener elements for touch fasteners, the mold roll comprising a stack of thin, sheet-form rings of heat-conducting material having an inner diameter and an outer diameter, each ring defining therein a circular array of holes near its periphery, and at least some rings comprising mold rings, each mold ring defining a series of mold cavities disposed at its periphery; the method comprising:

forming said cavities and holes, and stacking said rings in alignment such that the aligned holes form coolant passages through the mold roll, the passages extending through the roll for cooling the mold cavities via heat transfer from the material of the rings substantially directly to liquid coolant in contact with edges of the ring material about the holes.

20. The method of claim 19, wherein forming the cavities and holes is performed by a photochemical etching process.

21. The method of claim 19, further comprising applying a sealant to at least some of the rings to inhibit leakage of coolant from the coolant passages of the aligned stack.

22. The method of claim 21, wherein the sealant is thermally conductive and deposited along the coolant passages in an electroplating process.

23. The method of claim 19, wherein each ring defines an angular alignment hole therethrough, the stacking step including placing an angular alignment bar through the angular alignment hole of each ring to angularly align the rings of the aligned stack.

24. The method of claim 19, wherein at least many of the rings each have a thickness of between about 0.006 and 0.020 inch.

25. The method of claim 19, wherein each of the rings has a diameter of between about 8 and 12 inches.

26. The method of claim 19, wherein the mold cavities are sized to form features of about 0.005 to 0.1 inch in height and about 0.005 to 0.1 inch in width.

27. A method of molding a sheet-form article comprised of synthetic resin, the method comprising:

forming a mold roll according to claim 1 and mounting the mold roll for rotation about its axis; and then continuously filling the mold cavities with moldable resin under sufficient pressure to cause the resin to fill the mold cavities to form an article with features extending from a sheet-form base of said resin; while continuously removing the formed article from the mold roll by stripping the features from the mold cavities.

* * * * *

UNITED STATES PATENT AND TRADEMARK OFFICE
CERTIFICATE OF CORRECTION

PATENT NO.   : 6,533,981 B1                                                             Page 1 of 1
DATED        : March 18, 2004
INVENTOR(S)  : Richard M. Formato et al.

It is certified that error appears in the above-identified patent and that said Letters Patent is hereby corrected as shown below:

<u>Title page,</u>
Item [60], should read as follows:
--                      Related U.S. Application Data
[60]     This application is a 371 of PCT/US98/01053 filed Jan. 20, 1998, which is a division of application No. 08/926,517, filed on Sep. 10, 1997, now Pat. No. 6,039,556, which is a continuation-in-part of application No. 08/786,226, filed on Jan. 21, 1997, not Pat. No. 6,971,738. --

Signed and Sealed this

Thirtieth Day of March, 2004

JON W. DUDAS
*Acting Director of the United States Patent and Trademark Office*